Figure 1:
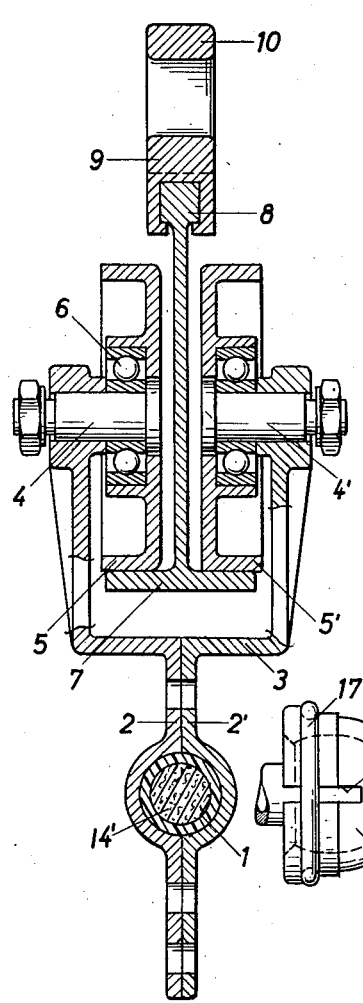

March 31, 1964 W. TOCHTERMANN ETAL 3,127,006
CHAIN CONVEYOR WITH PLASTIC BALL AND SOCKET CHAIN
Filed Jan. 19, 1961

Inventors
Walter Tochtermann
Alfred Richter
By Stevens Davis Miller & Mosher
Attorneys , 3,127,006
CHAIN CONVEYOR WITH PLASTIC BALL
AND SOCKET CHAIN
Walter Tochtermann, 24 Rosensteinweg, Ulm (Danube), Germany, and Alfred Richter, Offenbach (Main), Germany; said Richter assignor to C. S. Schmidt Gesellschaft für Fördertechnik m.b.H., Niederlahnstein, Germany, a corporation of Germany
Filed Jan. 19, 1961, Ser. No. 83,689
Claims priority, application Germany Jan. 26, 1960
4 Claims. (Cl. 198—177)

The invention relates to a novel and particularly advantageous chain conveyor. In such circulating conveyor systems, an endless chain moves along suspended rails or in a slotted tube. This chain is suspended from so-called hangers having roller runners moving in the respective rail. The hangers themselves, or at least a part thereof, are constructed for suspending the load carriers.

In known chain conveyors, the individual elements are made of steel. There is generally a considerable disparity with respect to weight between the chain conveyor construction and the useful load to be conveyed by the system, i.e. the weight of the construction is often much greater than the weight of the goods to be conveyed. Thus, the dimensioning of the individual circulating conveyor elements does not depend so much on the useful load as on its own weight. The weight of the conveyor chain, the conveyor guides and the hangers also determine the magnitude of the drive, due consideration being given to the conveyor path and the speed of conveying. The existing tensile forces result in the dimensioning of the actual conveying element, namely the chain.

This known construction further calls for the use of steel rails and a correspondingly robust mounting to the ceiling, to the walls or to the floor of the building for which the conveyor system is intended. Consequently, it is often necessary to reinforce the ceiling which is intended to receive the chain conveyor. The expenditure in material known in the art as "construction" is increased further by the necessarily heavily constructed drive, tensioning and rerouting stations. A further disadvantage of such known chain conveyors is that by reason of their considerable weight, their mounting at the selected site is difficult to carry out and then only with the aid of heavy tools, welding torches and lifting tackle, by a large labour force. It is a further disadvantage that the closed chain must usually be delivered in finished prefabricated form because of its construction, and therefore its mounting presents considerable difficulties. In order to achieve the reasonably quiet movement of the chain, the latter must be constantly lubricated, which is quite undesirable for some applications such as in the foodstuff industry because lubricants can very easily drip off. The frictional wear in the heavy conveyor elements generate a considerable amount of dust which is likewise a nuisance in dust-sensitive plants. Another disadvantage of the hitherto known chain conveyor is that special elements are necessary in the chain for applying the hangers and thus the spacing at which the load carriers are to be suspended must be predetermined. This fact also has the effect that after the conveyor system has been installed it is practically no longer possible to alter the spacing of the hangers or load carriers. Finally, the very high initial cost of these hitherto known circulating conveyors cannot be disregarded.

The present invention aims to provide a chain conveyor which is free from all the above-mentioned disadvantages of the hitherto known such conveyor systems. This problem is solved according to the invention in that the important structural parts of the chain conveyor, particularly the elements of its endless chain, the hangers carrying it and for suspending the load carriers, the roller runners holding the hangers and the suspended rails receiving the rollers, each comprise unitary elements which can be manually mounted and are made from plastic material such as polyamide, polycarbonate or glass fibre reinforced synthetic resin.

In view of its exceptionally low weight which, on the average, amounts to about one-sixth of the weight of similar conveyor systems made from steel, such a chain conveyor gives rise to a considerable reduction in the weight ratios between the structural elements of the conveyor and the load to be conveyed thereby. The plastic materials which are now available have such high tensile, bending and impact strengths that chain conveyors made from such plastic materials are just as durable as steel conveyor systems carrying comparatively lower useful loads. Moreover, the light weight of the individual conveyor elements not only leads to a favourable ratio between the useful load and the weight of the system, but also does not call for additional reinforced constructions and strengthening of the ceiling of the respective room. Further, in the chain conveyor according to the invention, the chain and its roller runners move much more lightly and with less noise. Lubrication of the rollers, or even the chain, is quite unnecessary, whereby such chain conveyors are particularly suitable for dirt-sensitive plants such as the foodstuffs industry. Frictional wear of the individual elements and the resulting dust formation also need not be considered. Since the individual elements are unitary, the manufacturing costs are lower and the assembly is simplified. Such assembly dispenses with lifting tackle or even welding torches because of the low weight of the individual conveyor elements. Such a circulating conveyor can be assembled with few workers which results in a considerable saving in work. In addition, this chain conveyor can be mounted much more quickly. Since the chain elements are identical, the lightweight elements can be delivered to the work site individually and there assembled in any desired sequence. Also, variations in the spacing of the hangers or load carriers can be made quickly and without effort, this often being necessary when the nature of the goods to be conveyed is changed. Finally, the light construction of this chain conveyor ensures that the drive elements and the tensioning and rerouting wheels can be made much lighter, for example from light metal and the connected electric load can be chosen much lower in comparison with hitherto known steel constructions. The cost of such a chain conveyor lies far below that of hitherto usual steel constructed conveyor systems.

According to a particularly advantageous embodiment of the invention, the chain elements have a neck-shaped preferably hollow central portion which can be clamped into an associated hanger and which is possibly provided with a glass fibre core, the central portion having a ball and a spherical socket at its respective ends, the resilient wall of the socket, which may be slotted in the direction of movement of chain, being able to embrace the ball of an adjacent chain element with the aid of a ring that can be tightly slipped over the slotted walls of the socket. If the ring has been withdrawn on to the central portion of such a chain element, the socket, by virtue of the elasticity of its wall, can easily be pushed over the ball of the adjacent chain element and pivotally coupled thereto by slipping the ring over the wall of the socket.

The hangers are preferably forked at the top, the roller runners being mounted on knockout spindles in the forked arms by means of ball bearings.

Further, it has been found advantageous if the suspension rails are provided with spaced lugs by which they can be mounted to the ceiling on steel cables, steel wires and the like and secured against lateral and longitudinal displacement.

The accompanying drawing diagrammatically illustrates by way of example a portion of a chain conveyor according to the present invention.

Figure 2:
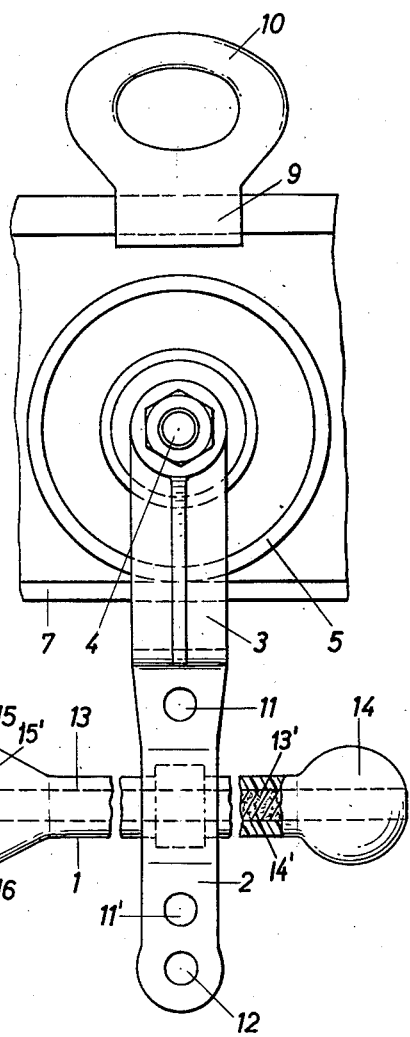

FIG. 1 shows this portion in cross-section, and
FIG. 2 is a side elevation thereof.

The chain conveyor consists of an endless chain of which a single element 1 is illustrated, this element being clamped between the two side limbs 2, 2' of a forked hanger 3. In each fork of this hanger there is located a knockout spindle 4, 4' on which two rollers, 5, 5' are mounted in ball races 6. The two roller runners run along rails 7 which are formed to have a statically favourable cross-sectional shape. The upper ends of the rails 7 are provided with an enlarged portion 8 extending over their whole length and over which the standardized suspension elements 9 are placed. These suspension elements have lugs 10 which are so constructed that supports such as steel cables, steel wires, etc., as well as the bracings against lateral or longitudinal displacement can be secured in it.

After the chain element 1 has been clamped into the sides 2, 2', bolts are inserted in the holes 11, 11' of these sides and secured with nuts. The hole 12 serves to suspend the respective load carrier.

The chain element 1 comprises a neck-shaped central portion 13 which may be hollow as shown at 13' or, for higher tensile loads, provided with a glass fibre core 14'. This central portion merges at one of its ends with a ball 14 which likewise may have a hole through it. At its other end, this central portion merges with a spherical socket 15 the flexible wall of which bounds an ellipsoidal recess and which may be longitudinally slotted at 15' to increase its elasticity. The wall of this spherical socket 15 embraces the ball 16 of the adjacent chain element and is held thereon by a ring 17 which is pushed over the wall of the socket 15 from the central portion 13 and engages in an external circumferential groove in the wall of the socket.

The chain elements, the hangers, the roller runners as well as the suspension rails are each made of a strong plastic material. For example, the chain elements are of polyamide or polycarbonate, the side limbs of the hangers are of a glass fibre reinforced artificial moulded resin, the roller runners are of polyamide and the suspension rails are of glass fibres reinforced polyester resins. The drive, tensioning and rerouting wheels are preferably of light metal and are equipped with plastic teeth shaped to conform to the chain. All drive, tensioning and rerouting wheels are preferably likewise mounted on ball bearings.

We claim:
1. In an endless chain conveyor of the type comprising a rail formed by a plurality of lengths of suspension rail connected together, wherein a plurality of said lengths are provided with an upstanding lug whereby the rail assembly is provided with a series of spaced apart lugs by means of which the rail assembly can be suspended, a plurality of pairs of roller runners movable on and supported by the rail, and a hanger depending from each pair of the roller runners, the upper portion of each of the hangers being forked, the roller runners being mounted for rotation, inwardly of the hangers and on each arm of the hangers, the improvement comprising: a plurality of chain links of strong plastic material, each chain link comprising a necked central portion, a ball at one end of said central portion, and a spherical socket at its other end, the ball being seated for limited movement in the socket of an adjacent chain link and the socket embracing the ball of the other adjacent chain link, ring and groove means disposed on the peripheral portion of the socket to maintain the ball of the adjacent chain link secured in the socket, means on the hangers tightly embracing the necked central portions of the chain links, and means on the hangers for supporting load carriers, the ball and socket connections between the chain links permitting free angling in all directions of the hangers relative to each other.

2. The structure of claim 1, and wherein the walls of each spherical socket are slotted parallel to the longitudinal axis of the necked central portion of the associated chain link and wherein said ring and groove means comprises a ring fitted tightly in a peripheral groove on the socket extending in a plane transverse to said axis.

3. The structure of claim 2, and wherein the central portion of each chain link is hollow.

4. The structure of claim 2, and wherein the central portion of each chain link has a glass fibre core.

References Cited in the file of this patent
UNITED STATES PATENTS

| | | |
|---|---|---|
| 538,222 | Davids | Apr. 23, 1895 |
| 566,095 | Reenstierna | Aug. 18, 1896 |
| 1,186,428 | Newman | June 6, 1916 |
| 1,702,803 | Webb | Feb. 19, 1929 |
| 2,008,960 | Lampard | July 23, 1935 |
| 2,065,931 | Alling | Dec. 29, 1936 |
| 2,910,260 | Tanner | Oct. 27, 1959 |
| 2,911,091 | Imse | Nov. 3, 1959 |